US007536493B2

(12) United States Patent
Anderson et al.

(10) Patent No.: US 7,536,493 B2
(45) Date of Patent: May 19, 2009

(54) METHOD AND APPARATUS FOR IDENTIFYING A SERVICE PROCESSOR WITH CURRENT SETTING INFORMATION

(75) Inventors: Gary Dean Anderson, Austin, TX (US); Joseph Donald Armstrong, Rochester, MN (US); Brent William Jacobs, Rochester, MN (US); Ajay Kumar Mahajan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 11/279,436

(22) Filed: Apr. 12, 2006

(65) Prior Publication Data

US 2007/0245406 A1    Oct. 18, 2007

(51) Int. Cl.
*G06F 13/14* (2006.01)
(52) U.S. Cl. .................. 710/305; 710/306; 710/104; 712/16
(58) Field of Classification Search .............. 710/104, 710/301–306; 709/224; 713/322; 712/16
See application file for complete search history.

(56) References Cited

U.S. PATENT DOCUMENTS

| 6,584,573 | B1 * | 6/2003 | Wunderlich et al. ......... 713/322 |
| 6,868,479 | B1 | 3/2005 | Thibault et al. |
| 6,931,568 | B2 | 8/2005 | Abbondanzio et al. |
| 2002/0193152 | A1 * | 12/2002 | Soini et al. .................. 455/569 |
| 2003/0002508 | A1 | 1/2003 | Dierks, Jr. et al. |
| 2003/0118029 | A1 | 6/2003 | Maher, III et al. |
| 2004/0190046 | A1 * | 9/2004 | Ilda ........................... 358/1.15 |
| 2005/0027548 | A1 | 2/2005 | Jacobs et al. |
| 2007/0038747 | A1 * | 2/2007 | Kishimoto et al. .......... 709/224 |

* cited by examiner

*Primary Examiner*—Clifford H Knoll
*Assistant Examiner*—Kim T Huynh
(74) *Attorney, Agent, or Firm*—Yee & Associates, P.C.; Libby Z. Handelsman

(57) ABSTRACT

The aspects of the present invention provide a computer implemented method, an apparatus, and a computer usable program code for identifying a service processor with current setting information. First stored information for a service processor is retrieved from a first memory in the first service processor. Second stored information for the service processor is retrieved from a second memory in a data processing system to which the service processor is connected. The first stored information is compared with the second stored information to form a comparison as to whether the service processor was previously connected to the data processing system and to determine whether the service processor was a last service processor to fully communicate with system firmware in the data processing system. The service processor has current setting information if the service processor was previously connected to the data processing system and was the last service processor to fully communicate with the system firmware.

19 Claims, 9 Drawing Sheets

| KEYWORD | LENGTH (IN BYTES) | DATA |
|---|---|---|
| RT - RECORD NAME | 0x04 | VSYS |
| DR - DESCRIPTION | 0x06 | SYSTEM |
| BR - BRAND | 0x02 | 01 |
| SE - SYSTEM SERIAL NUMBER | 0x07 | 7879001 |
| SG - SYSTEM SERIAL NUMBER | 0x07 | 112CDCC |
| TM - TYPE/MODEL | 0x08 | 91187879 |
| TN - TYPE/MODEL | 0x08 | 0000000 |
| MN - MANUFACTURING DATE | 0x07 | 2005001 |
| ID - SYSTEM ID | 0x02 | 02 |
| SU - SYSTEM UNIQUE ID | 0x06 | 123456 |
| FP - PRIMARY SERVICE PROCESSOR SERIAL NUMBER | 0x07 | 11S1234 |

FIG. 3

| | Temporary Primary Service Processor Unit | | Second Service Processor Unit | | Primary Role 330 | Secondary Role 340 | Error In 350 |
|---|---|---|---|---|---|---|---|
| | Last System Connected To? 312 | Last to Communicate With System Firmware? 314 | Last System Connected? 322 | Last to Communicate With System Firmware? 324 | | | |
| 360 | YES | YES | YES OR NO | NO | TEMPORARY PRIMARY SERVICE PROCESSOR | SECOND SERVICE PROCESSOR | NONE |
| 361 | YES OR NO | NO | YES | YES | SECOND SERVICE PROCESSOR | TEMPORARY PRIMARY SERVICE PROCESSOR | NONE |
| 362 | NO | YES | NO | NO | FIRST SLOT | SECOND SLOT | SYSTEM FIRMWARE AND SERVICE PROCESSOR DATA |
| 363 | NO | NO | NO | YES OR NO | FIRST SLOT | SECOND SLOT | SYSTEM FIRMWARE AND SERVICE PROCESSOR DATA |
| 364 | YES | NO | YES | NO | FIRST SLOT | SECOND SLOT | SYSTEM FIRMWARE DATA |
| 365 | YES | NO | NO | YES OR NO | TEMPORARY PRIMARY SERVICE PROCESSOR | SECOND SERVICE PROCESSOR | SYSTEM FIRMWARE DATA |
| 366 | NO | YES OR NO | YES | NO | SECOND SERVICE PROCESSOR | TEMPORARY PRIMARY SERVICE PROCESSOR | SYSTEM FIRMWARE DATA |
| 367 | NO | NO | YES | NO | SECOND SERVICE PROCESSOR | TEMPORARY PRIMARY SERVICE PROCESSOR | SYSTEM FIRMWARE DATA |

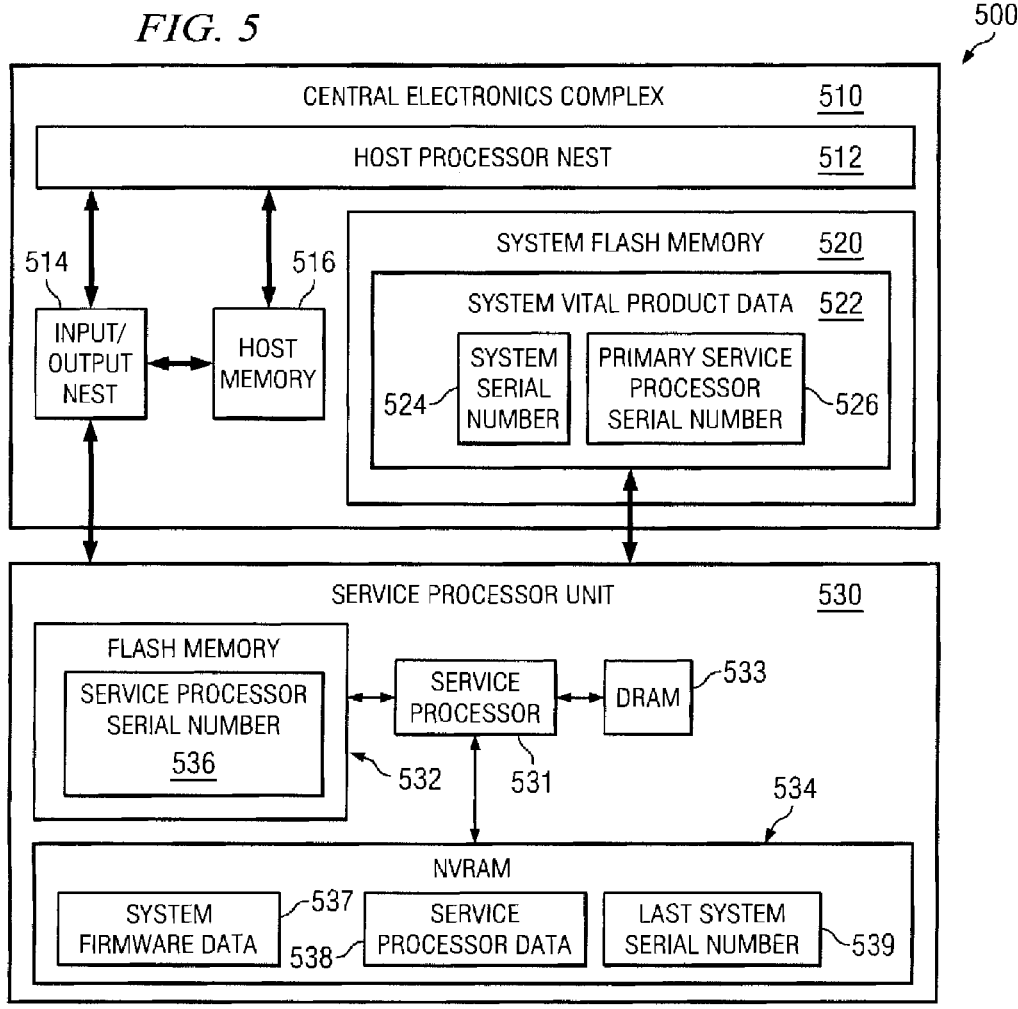

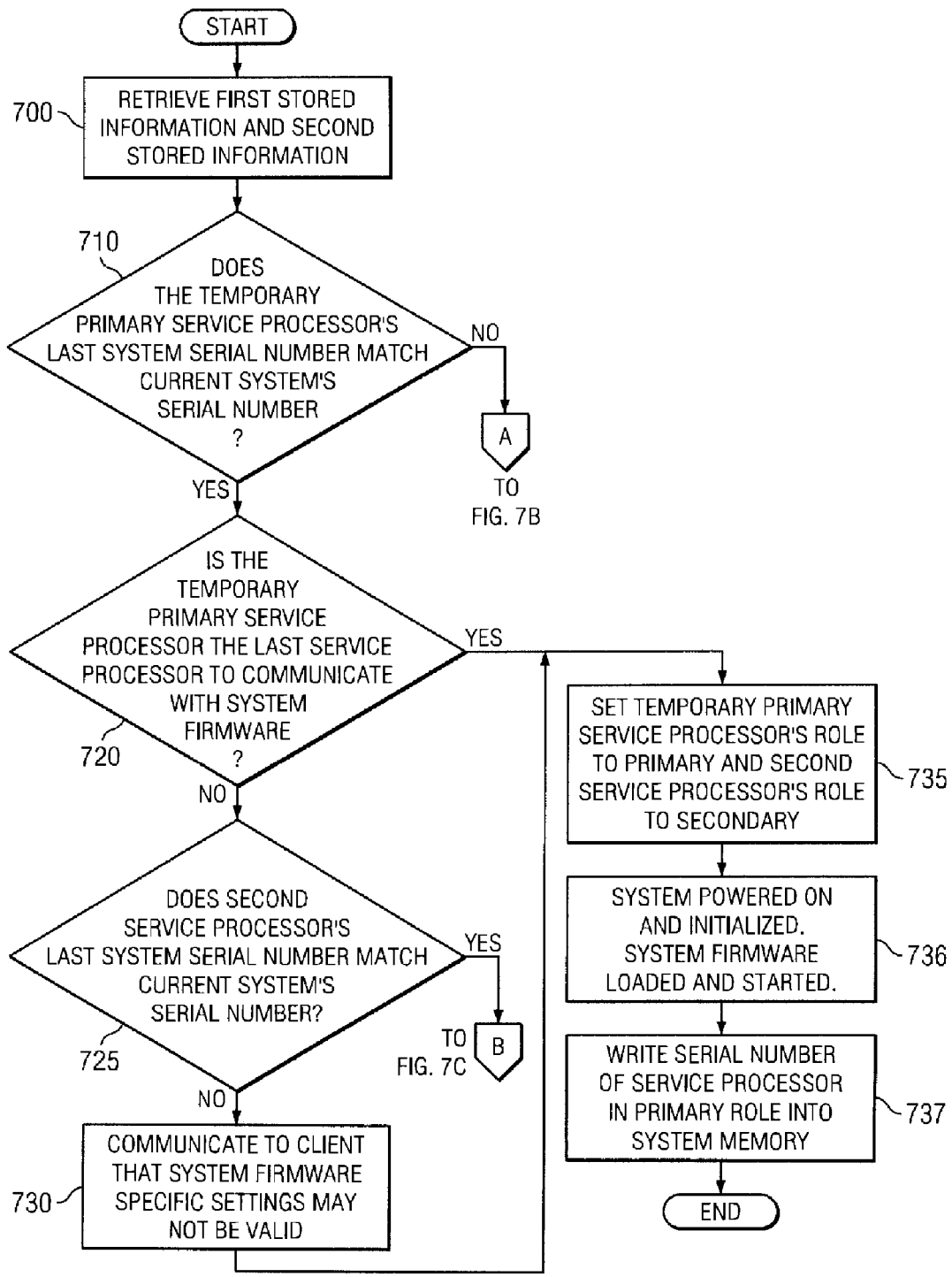

METHOD AND APPARATUS FOR IDENTIFYING A SERVICE PROCESSOR WITH CURRENT SETTING INFORMATION

BACKGROUND OF THE INVENTION

1. Field of the Invention

The present invention relates generally to an improved data processing system and to a method for identifying a service processor. Still more particularly, the present invention relates to a computer implemented method, apparatus, and computer usable program code for identifying a service processor with current information settings.

2. Description of the Related Art

Service processors are typically used to monitor the environmental health of a data processing system. Service processors also contain information that persists even when power is removed from the data processing system. The persisted information is pertinent to the continuity and successful operation of the data processing system. Examples of the persisted information include recovery policies and customer specific passwords.

In a logical partitioned configuration, commonly referred to as LPAR, service processors are typically moved from one data processing system to another data processing system as part of the repair process. Because the customer specific settings are stored on the service processor itself, the customer specific settings may also move as a result of moving the service processor. Consequently, customer specific settings may be lost or become outdated if the correct service processor is not matched with the correct customer's data processing system.

The use of redundant service processors in a single data processing system mitigates the possibility of lost or outdated data. However, the possibility of multiple sets of customer settings also now exists. In other words, in one data processing system, a current set of customer settings could exist on one service processor, while another outdated set of customer settings could exist on another service processor.

Relying on the data time stamp alone to determine which service processor has the most current data is insufficient. Data time stamps are attached to a service processor after the service processor moves into the data processing system. Therefore, a service processor incorporated after a data processing system shuts down may have a newer data time stamp than a redundant service processor that was in the data processing system when the data processing system last booted up. The redundant service processor with the older data time stamp has the most current customer settings since the redundant service processor last interacted with the data processing system. However, the service processor incorporated later has the newer data time stamp. Thus, relying upon the data time stamp will result in the usage of the wrong service processor.

SUMMARY OF THE INVENTION

The aspects of the present invention provide a computer implemented method, an apparatus, and a computer usable program code for identifying a service processor with current setting information. First stored information for a service processor is retrieved from a first memory in the first service processor. Second stored information for the service processor is retrieved from a second memory in a data processing system to which the service processor is connected. The first stored information is compared with the second stored information to form a comparison as to whether the service processor was previously connected to the data processing system and to determine whether the service processor was a last service processor to fully communicate with system firmware in the data processing system. The service processor has current setting information if the service processor was previously connected to the data processing system and was the last service processor to fully communicate with the system firmware.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 illustrates a summary of the execution of the method for identifying a service processor for a redundant service processor system, in accordance with an illustrative embodiment of the present invention;

FIG. 5 depicts a block diagram of a data processing system with a single service processor, in accordance with an illustrative embodiment of the present invention;

FIG. 6 illustrates a summary of the execution of the method for identifying a service processor in a single service processor system, in accordance with an illustrative embodiment of the present invention;

FIGS. 7A, 7B, and 7C are a flowchart of a process for identifying a service processor in a redundant service processor system, in accordance with an illustrative embodiment of the present invention;

DETAILED DESCRIPTION OF THE PREFERRED EMBODIMENT

Figures 1, 4:
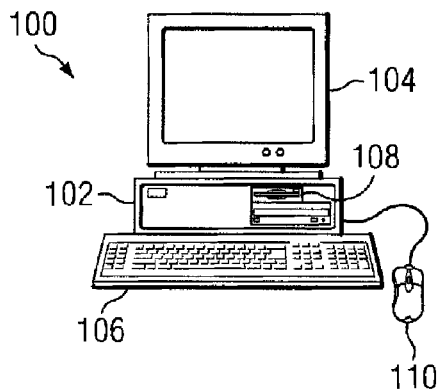
FIG. 1 depicts a pictorial representation of a computer in which aspects of the present invention may be implemented.
FIG. 4 illustrates a table of system vital product data, in accordance with an illustrative embodiment of the present invention.

With reference now to the figures and in particular with reference to FIG. 1, a pictorial representation of a data processing system in which aspects of the present invention may be implemented is depicted in accordance with a preferred embodiment of the present invention. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
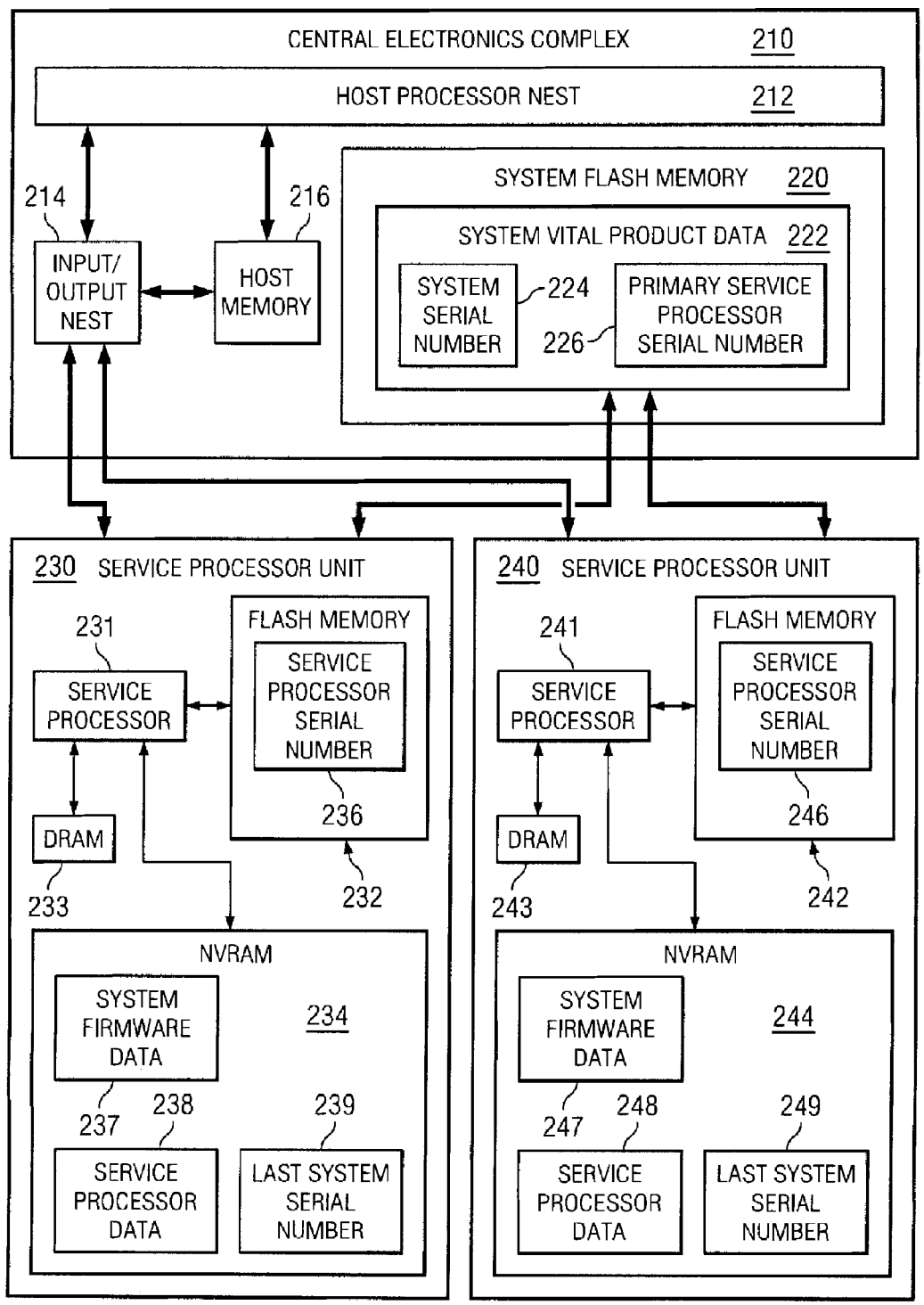
FIG. 2 depicts a block diagram of a data processing system with redundant service processors, in accordance with an illustrative embodiment of the present invention.

FIG. 2 depicts a block diagram of a data processing system with redundant service processors, in accordance with an illustrative embodiment of the present invention. Data processing system 200 is an example of a computer, similar to computer 100 of FIG. 1, in which computer usable code or instructions for implementing the processes for embodiments of the present invention may be located. Data processing system 200 includes central electronics complex 210, and service processor units 230 and 240. In these examples, central electronics complex 210 is a component that houses the system memory and processor units. In one embodiment in these examples, central electronics complex 210 can be formed from four motherboards plugged into a single backplane.

As illustrated, central electronics complex 210 includes host processor nest 212, input/output nest 214, host memory 216, and system flash memory 220. Host processor nest 212 is a plurality of processors clustered together through a communications fabric. The communications fabric may take any form, but, in these examples, the fabric is a bus. Host processor nest 212 typically has sixteen processors but may have more or less processors depending upon the implementation.

In these examples, host processor nest 212 and input/output nest 214 each have the ability to directly access host memory 216. Additionally, in these examples, host processor nest 212 connects to input/output nest 214 and host memory 216 through a parallel bus. Input/output nest 214 typically includes thirty-two hubs with each hub providing three serial buses. However, input/output nest 214 is not limited to the configuration described and may include more or less hubs and serial buses within each hub. Input/output nest 214 may also connect to an input/output tower which bridges to multiple PCI buses. Input/output nest 214 connects directly to host memory 216. System firmware is loaded into host memory 216 after central electronics complex 210 initializes. Host processor nest 212 executes the system firmware loaded in host memory 216.

System flash memory 220 resides in central electronics complex 210. System flash memory 220 is an example of flash memory in which system vital product data 222 is stored. System vital product data 222 is a repository of information stored in a table, flat file, or other similar storage mechanism. System vital product data 222 holds information, such as system serial number 224 and primary service processor serial number 226. System serial number 224 is the serial number of data processing system 200. Primary service processor serial number 226 is the serial number of the primary service processor that most recently or last interacted with data processing system 200.

In these examples, input/output nest 214 connects to service processor units 230 and 240 via a high speed serial bus. System vital product data 222 connects to service processor units 230 and 240 via an I2C bus. In these examples, as well, data processing system 200 is a system with multiple service processors. However, data processing system 200 is not limited to the illustrative embodiment and may include more or less service processors, but, typically, a system with multiple service processors includes two service processors.

Service processor 231 connects to flash memory 232, DRAM 233, and NVRAM 234. All these components form a module or service processor unit 230. Flash memory 232 is an example of the flash memory in which executable code for service processor 231 or host processor nest 212 may be stored. In these examples, flash memory 232 also stores the serial number for the service processor, referred to as service processor serial number 236, as well as the system firmware. As part of the initialization process, the system firmware is loaded into host memory 216 in central electronics complex 210.

DRAM 233 is a memory where executables from flash memory 232 are loaded for execution by service processor 231. NVRAM 234 may be used to hold data that is to be retained when the system is powered down, such as system firmware data 237 or service processor data 238. System firmware data 237 includes information related to logical partitions. Service processor data 238 includes information such as system recovery policies and passwords. In these examples, NVRAM 234 also stores the serial number of the last system that service processor unit 230 communicated with, referred to as last system serial number 239.

Service processor unit 240 is similar to service processor unit 230. Service processor 241 is connected to flash memory 242, DRAM 243, and NVRAM 244. All these components form a module or service processor unit 240. Flash memory 242 stores the system firmware and service processor serial number 246. NVRAM 244 holds system firmware data 247 and service processor data 248. NVRAM 244 also stores last system serial number 249.

Just as service processor serial number 236 and last system serial number 239 constitute a portion of the service processor vital product data for service processor unit 230, service processor serial number 246 and last system serial number 249 constitute a portion of the service processor vital product data for service processor unit 240. The vital product data for service processor units 230 and 240 are similar to system vital product data 222.

In use, the aspects of the present invention provide a computer implemented method, apparatus, and computer usable processing code for identifying a service processor with current setting information. The identification allows for the service processor with the most current system settings to interact with the data processing system. In general, the information used to make the determination is stored in system flash memory 220, flash memories 232 and 242, and NVRAM 234 and 244. Information stored in service processor units 230 and 240 is used to determine whether the service processor unit was previously connected to the system to which the service processor unit is currently connected. Thus, in the illustrative embodiment, the information stored in service processor units 230 and 240 is used to determine whether either of service processors 231 and 241 was previously connected to system 200. Information stored in the system memory is used to determine which service processor last communicated with the system firmware. In other words, in the illustrative embodiment, the information stored in the memory of system 200 is used to determine whether service processor 231, service processor 241, or another service processor was the last service processor to communicate with system 200.

In a redundant service processor system, such as system 200 illustrated in FIG. 2, the method of identifying a service processor begins with assigning a temporary primary service processor to the system. The temporary primary service processor is based on either the physical location or the slot location of the service processor in the system. A slot is an apparatus for receiving a service processor for system 200. For example, service processor 231 resides in the first slot, and service processor 241 resides in the second slot. In accordance with the illustrative embodiment, the first slot is designated as the location for the temporary primary service processor. Therefore, in accordance with the illustrative embodiment, service processor 231 is designated as the temporary primary service processor.

After service processor 231 is designated as the temporary primary service processor, service processor 231 retrieves first stored information and second stored information. The first stored information is stored in first memory for service processor 230 and is the vital product data for service processor 230. In these examples, the first memory is flash memory 232 and NVRAM 234 and the vital product data for service processor 231 is service processor serial number 236 and last system serial number 239. The second stored information is stored in the second memory and is system vital product data 222. In these examples, the second stored information is system flash memory 220. System vital product 222 includes system serial number 224 and primary service processor serial number 226.

In order to retrieve the second stored information, temporary primary service processor 231 executes code that makes a request to read all data contained in system vital product data 222 in system flash memory 220. System vital product 222 is then sent to service processor unit 230, and the collected information from system vital product 222 is cached in DRAM 233.

Temporary primary service processor 231 then executes code to parse through the data collected from system 200 and to locate system serial number 224 and primary service processor serial number 226. Temporary primary service processor 231 then compares last system serial number 239 against system serial number 224 to determine whether service processor 231 was previously connected to system 200. Temporary primary service processor 231 also makes a comparison of service processor serial number 236 against primary service processor serial number 226 to determine whether service processor 231 was the last service processor to fully communicate with the system firmware in system 200.

If temporary primary service processor 231 was the last service processor to fully communicate with the system firmware, then temporary primary service processor 231 proceeds to execute code to compare system serial number 224 against last system serial number 239. In the illustrative embodiment, the system serial numbers are compared to verify that system 200 was the last system to interact and connect to temporary primary service processor 231.

If system 200 is the last system to interact with temporary primary service processor 231, then temporary primary service processor 231 has the most current system settings and is designated as the primary service processor. Any other service processor, such as service processor 241, is assigned as the secondary or back-up service processor. The secondary service processor, or service processor 241, will take over the responsibilities of the primary service processor, service processor 231, in the event that service processor 231 fails or is otherwise removed from system 200.

After the primary and secondary service processors are designated, central electronics complex 210 is powered on. Service processors 231 and 241 operate under standby power during the process of identifying the service processor with the most current settings. The application of standby power occurs when a system is plugged into an AC line. The application of standby power triggers initialization of service processors 231 and 241 and, thus, the identification process. The secondary or back-up service processor remains in the standby role until a request or a determination is made that the secondary service processor needs to take over responsibilities as the primary service processor.

Central electronics complex 210 operates under a different power called bulk power. Thus, once bulk power is applied to central electronics complex 210, initialization of central electronics complex 210 begins. System firmware stored in flash memory 232 is loaded into host memory 216. Next, host processor nest 212 executes and starts the system firmware. Service processor 231 then writes service processor serial number 236 into the location for primary service processor serial number 226 in the system flash memory 220. Service processor 231 also writes system serial number 224 into last system serial number 239.

If, however, temporary primary service processor 231 is not the last service processor or system 200 is not the last data processing system to communicate with service processor unit 230, then temporary primary service processor 231 uses a similar process to determine whether service processor 241 has the most current system settings. In the illustrative embodiment, service processor 230 proceeds to retrieve a third stored information stored in third memory in the second service processor. The third memory is flash memory 242 and NVRAM 244. Third stored information is the vital product data for service processor unit 240. In these examples, the third stored information includes service processor serial number 246 and last system serial number 249.

Temporary primary service processor 231 then executes code to collect the third stored information and to store the information in DRAM 233. Temporary primary service processor 231 then parses the information to locate service processor serial number 246 and last system serial number 248. Temporary primary service processor 231 then compares service processor serial number 246 against primary service processor serial number 246. Temporary primary service processor 231 also compares system serial number 224 against last system serial number 249. If second service processor 241 is the last primary service processor and system 200 is the last data processing system to communicate with service processor unit 240, then second service processor 241 is designated as the primary role and the temporary primary service processor 231 is designated as the secondary role. After the roles are determined, bulk power is applied to central electronics complex 210. Central electronics system 210 begins initialization and system firmware is loaded from flash memory 242 to host memory 216. Host processor nest 212 executes and starts the system firmware. Then, service processor 241 writes service processor serial number 246 into system serial number 224. Service processor 241 also writes system serial number 224 into last system serial number 249.

The aspects of the present invention are not limited to the described embodiments. For example, in certain situations, the system and/or the service processor data may not be current. As a result, in certain embodiments, neither service processor 231 or service processor 241 will be the last primary service processor to communicate with system 200. In other embodiments, system 200 will not be the last system connected to service processors 231 and 241. Thus, the aspects of the present invention also provide a mechanism for informing a client of possible information losses in the system settings by sending an error message to the client. One error message may indicate possible configuration information lost in both the system firmware data and the service processor data, and another error message may indicate possible configuration information lost in the system firmware data only. The determination of which error message to log is based on whether the service processors were last connected to the system and whether one service processor was the last to communicate with system firmware. For example, if either service processor 231 or 241 was previously connected to system 200, but neither service processor 231 or 241 was the last to communicate with system firmware, then an error message indicating loss of configuration information in system firmware data 237 and 247 is sent to the client. However, if neither service processor 231 or 241 were previously connected to system 200, then an error message indicating loss of configuration information in both system firmware data 237 and 247 and service processor data 238 and 249 is sent to the client.

The aspects of the present invention may also request that the client take certain recovery actions in conjunction with sending an error message. The aspects of the present invention allow for either the temporary primary service processor or the primary service processor to communicate the error messages.

In addition, the aspects of the present invention provide a default mechanism for determining the role of a service processor. The default role determination is based on the physical slot location of the service processor. In one embodiment, the first slot may be designated as the default primary role and the second slot may be designated as the default secondary role. However, in another embodiment, the first and second slot default designations may be switched. Like the error messages, the determination to use the default roles is based on whether the service processors are not the last service processors or whether the system is not the last data processing system. For example, in the illustrative embodiment, if neither service processor 231 nor service processor 241 was the last primary service processor and system 200 was not the last data processing system to communicate with service processors 231 and 241, then the physical slot location determines the role of the service processor.

The aspects of the present invention also provide for the service processor in the secondary role to take over the primary role. In the event that the primary service processor fails or is otherwise removed, the secondary service processor will execute code to take over the primary role. In these examples, if service processor 241 is the secondary processor, then service processor 241 will send a message to system 200 that service processor 241 is now acting in the primary role. The system firmware in system 200 will then determine whether system firmware data 247 has the current system settings. If system firmware data 247 is current, then system 200 acknowledges that service processor 241 is now the primary service processor. If system firmware data 247 is not current, then system 200 will update system firmware data 247 before acknowledging that service processor 241 is in the primary role. After acknowledging the new primary service processor, service processor 241 writes service processor serial number 246 into primary service processor serial number 226. Service processor 241 also writes system serial number 224 into last system serial number 249.

FIG. 3 illustrates a summary of the execution of the method for identifying a service processor for a redundant service processor system, in accordance with an illustrative embodiment of the present invention. Chart 300 applies to a redundant service processor system like data processor system 200 of FIG. 2. Chart 300 has a temporary primary service processor unit column 310, second service processor unit column 320, primary role column 330, secondary role column 340, and error in column 350. Temporary primary service processor unit 310 and second service processor unit 320 are similar to service processor units 230 and 240, respectively, of FIG. 2.

Temporary primary service processor unit 310 includes columns 312 and 314. Column 312 indicates that the data processing system is the last data processing system to which the temporary service processor was connected. Thus, column 312 shows the results of a comparison between the system serial number to which the temporary service processor is currently connected and the last system serial number recorded in the memory of the temporary service processor. Column 314 indicates that the temporary service processor was the last service processor to fully communicate with the system firmware. Thus, column 314 shows the results of a comparison between the serial number of the temporary service processor and the serial number of the last primary service processor to connect with the data processing system. A "yes" output in columns 312 and 314 indicates that the serial numbers match, and a "no" output indicates that the serial numbers do not match.

Similar to temporary service processor unit column 310, second service processor unit column 320 includes columns 322 and 324. Column 322 indicates that the data processing system is the last data processing system to which the second service processor was connected. Thus, column 322 shows the results of a comparison between the system serial number to which the second service processor is currently connected and the last system serial number recorded in the memory of the temporary service processor. Column 324 indicates that the second service processor was the last service processor to fully communicate with the system firmware. Thus, column 324 shows the results of a comparison between the serial number of the second service processor and the serial number of the last primary service processor to connect with the data processing system. A "yes" output in columns 312 and 314 indicates that the serial numbers match, and a "no" output indicates that the serial numbers do not match.

Primary role column 330 indicates which service processor, the temporary primary service processor or the second service processor, will take the primary role. Secondary role column 340 indicates which service processor will take the secondary role. Error in column 350 indicates the location in the system where configuration information may have been lost. Configuration information may be lost in only the system firmware data or in both the system firmware data and the data in the service processors.

Rows 360 through 367 depict the role of each service processor based on the results of the determinations made in columns 312, 314, 322, and 324. For example, row 360 indicates that primary role 330 is assigned to the temporary primary service processor and secondary role 340 to the second service processor when (1) the current system is the last system to which the temporary service processor was connected, and (2) the temporary service processor was the last service processor to fully communicate with the system firmware. Likewise, in row 361, primary role 330 is assigned to the second service processor and secondary role 340 is assigned to the temporary primary service processor when (1) the current system is the last system to which the second service processor was connected, and (2) the second service processor was the last service processor to fully communicate with the system firmware.

Rows 362 and 363 indicate that primary role 330 and secondary role 340 are based on the physical slot location of the service processors. In these examples, primary role 330 is assigned to the first slot and secondary role 340 is assigned to the second slot. Thus, if the conditions present in columns 312, 314, 322, and 324 exist, then the primary and secondary roles are determined by slot location.

Rows 364 through 367 indicate a potential loss of configuration information in only the system firmware data or in both the system firmware data and the data in the service processors. If the conditions in columns 312, 314, 322, and 324 exist, then the service processor will send an error message indicating the loss of configuration information in the area specified in column 350.

FIG. 4 illustrates a table of system vital product data, in accordance with an illustrative embodiment of the present invention. Table 400 is an example of a table that may be found in system vital product data 222 of FIG. 2. Table 400 includes keyword column 410, length column 420, and data column 430. Keyword column 410 lists the keywords that a program uses to search for particular data in the system or service processor memory. The keywords in keyword column 410 are each two bytes long and are represented as an American Standard Code for Information Interchange (ASCII) value. In the illustrative embodiment, each two byte character in keyword column 410 represents a different data type. For example, in the illustrative embodiment, RT in keyword column 410 represents "record name," DR represents "description," BR represents "brand," SE and SG represent "system serial number," TM and TN represent "type/model," MN represents "manufacturing date," ID represents "system ID," SU represents "system unique ID," and FP represents "primary service processor serial number." In use, keyword column 410 will list the two byte character. In other words, in the illustrative embodiment, only RT will appear in the table and "record name" will not appear in the table.

The lengths in length column 420 are each one byte long and show the length of the data field that is represented in data column 430. The values in length column 420 are represented as a hexadecimal value. The value in length column 420 also indicates where the next keyword in keyword column 410 begins in memory. In the illustrative embodiment, keyword RT has a length of 0x04, DR has a length of 0x06, BR has a length of 0x02, SE and SG have a length of 0x07, TM and TN have a length of 0x08, MN has a length of 0x07, ID has a length of 0x02, SU has a length of 0x06, and FP has a length of 0x07.

Data column 430 is the actual vital product data for the system. The values in data column 430 are represented as an American Standard Code for Information Interchange (ASCII) value. In the aspects of the present invention, the service processor will search for the information in the data fields for the system serial number and the primary service processor serial number. In the illustrative embodiment, the service processor will parse through the data in data column 430 for keywords SE and SG in column 410. Thus, in the illustrative embodiment, the system serial numbers are 7879001 and 112CDCC, and the primary service processor serial number is 11S1234.

FIG. 5 depicts a block diagram of a data processing system with a single service processor, in accordance with an illustrative embodiment of the present invention. Data processing system 500 is an example of a computer, similar to computer 100 of FIG. 1, in which computer usable code or instructions for implementing the processes for embodiments of the present invention may be located. Data processing system 500 is also similar to data processing system 200 of FIG. 2, except that data processing system 500 has a single service processor rather than a redundant service processor as illustrated in data processing system 200.

In the depicted example, data processing system 500 includes central electronics complex 510 and service processor unit 530. In these examples, central electronics complex 510 is a component that houses the system memory and processor units. As illustrated, central electronics complex 510 includes host processor nest 512, input/output nest 514, host memory 516, and system flash memory 520. Host processor nest 512 is a plurality of processors clustered together through a communications fabric, and in these examples, the fabric is a bus. Host processor nest 512 typically has sixteen processors but may also have more or less processors depending on the implementation.

The system firmware for central electronics complex 510 executes in host processor nest 512. The system firmware data holds pertinent information that is maintained even if power is removed from the system.

In these examples, host processor nest 512 and input/output nest 514 each have the ability to directly access host memory 516. Additionally, in these examples, host processor nest 512 connects to input/output nest 514 and host memory 516 through a parallel bus. Input/output nest 514 typically includes thirty-two hubs with each hub providing three serial buses. However, input/output nest 514 is not limited to the configuration described and may include more or less hubs and serial buses within each hub. Input/output nest 514 connects directly to host memory 516. Host memory 516 loads and maintains a copy of the system firmware after central electronics complex 510 initializes. Host processor nest 512 executes the system firmware loaded in host memory 516.

System flash memory 520 resides in central electronics complex 510. System vital product data 522 is stored in system flash memory 520. System vital product data 522 is similar to table 400 of FIG. 4. System vital product data 522 holds information, such as system serial number 524 and primary service processor serial number 526. System serial number 524 is the serial number of data processing system 500. Primary service processor serial number 526 is the primary service processor that most recently or last interacted with data processing system 500.

In these examples, input/output nest 514 connects to service processor unit 530 via a high speed serial bus. System vital product data 522 connects to service processor unit 530 via an I2C bus. Service processor 531 is connected to flash memory 532, DRAM 533, and NVRAM 534. All these components form a module or service processor unit 530. Flash memory 532 is an example of the flash memory in which executable code for the service processor 531 or host processor nest 512 may be stored. In these examples, flash memory 532 also stores the serial number for the service processor, referred to as service processor serial number 536, and the system firmware. As part of the initialization process, the system firmware is loaded into host memory 516 in central electronics complex 510.

DRAM 533 is a memory where executables from flash memory 532 are loaded for execution by processor 531. NVRAM 534 may be used to hold data that is to be retained when the system is powered down, such as system firmware data 537 and service processor data 538. System firmware data 537 includes information related to logical partitions. Service processor data 538 includes information such as system recovery policies and passwords. In these examples, NVRAM 534 also stores the serial number of the last system that service processor unit 530 communicated with, referred to as last system serial number 539.

Service processor serial number 536 and last system serial number 539 constitute a portion of the service processor vital product data for service processor unit 530. Service processor vital product data is similar to system vital product data 522.

In use, the aspects of the present invention provide a computer implemented method, a data processing system, and computer usable processing code for identifying a service processor with current system information. The identification indicates whether system 500 and service processor 530 have the most current system settings. In a single service processor system, such as system 500 in FIG. 5, the method begins with service processor 531 retrieving first stored information and second stored information. The first stored information is stored in first memory for service processor unit 530. In these examples, the first memory is flash memory 532 and NVRAM 534. The first stored information is the vital product data for service processor unit 530, which includes service processor serial number 536 and last system serial number 539. The second stored information is stored in the second memory, which is the information in system vital product data 522. In these examples, the second stored information is system flash memory 520. System vital product data 522 includes system serial number 524 and primary service processor serial number 526.

In order to retrieve the second stored information, service processor 531 executes code that makes a request to read all data contained in system vital product data 522 in system flash memory 520. System vital product 522 is then sent to service processor unit 530, and the collected information from system vital product 522 is cached in DRAM 533. Service processor 531 then executes code to parse through the data in system vital product data 522 to locate system serial number 524 and primary service processor serial number 526. Service processor 531 then compares service processor serial number 536 against primary service processor serial number 526. Service processor 531 makes the comparison to determine (1) whether service processor 531 was previously connected to system 500 and (2) whether service processor 531 was the last service processor to fully communicate with the system firmware in system 500.

If service processor 531 was the last service processor to fully communicate with the system firmware, then service processor 531 proceeds to execute code to compare system serial number 524 against last system serial number 539. In the illustrative embodiment, the system serial numbers are compared to verify that system 500 was the last system to interact with and connect to temporary primary service processor 531.

If system 500 is the last system to interact with service processor 531, then service processor 531 has the most current system settings and is designated as the primary service processor. Then, bulk power is applied to central electronics complex 510 and initialization of central electronics complex 510 begins. System firmware stored in flash memory 532 is loaded into host memory 516. Next, host processor nest 512 executes and starts the system firmware. Service processor 531 then writes service processor serial number 536 into the location for primary service processor serial number 526 in the system flash memory 520. Service processor 531 also writes system serial number 524 into last system serial number 539.

If, however, service processor 531 is not the last service processor or system 500 is not the last data processing system to communicate with service processor unit 530, then service processor unit 530 is designated as the primary role. However, an error message is sent to the client. The type of error message sent to the client depends on the area in the system that may have suffered configuration information loss. One error message may indicate possible configuration information lost in both the system firmware data and the service processor data. Another error message indicates possible configuration information lost in the system firmware data only.

FIG. 6 illustrates a summary of the execution of the method for identifying a service processor in a single service processor system, in accordance with an illustrative embodiment of the present invention. Chart 600 is similar to chart 300 of FIG. 3 except that chart 600 applies to a single service processor system, such as data processing system 500 of FIG. 5.

Chart 600 contains columns 610, 620, and 630. Column 610 indicates that the data processing system is the last data processing system to which the temporary service processor was connected. Thus, column 610 shows the results of a comparison between the system serial number to which the service processor is currently connected and the last system serial number recorded in the memory of the temporary service processor. Column 620 indicates that the temporary service processor was the last service processor to fully communicate with the system firmware. Thus, column 620 shows the results of a comparison between the serial number of the service processor and the serial number of the last primary service processor to connect with the data processing system. A "yes" output in columns 610 and 620 indicates that the serial numbers match, and a "no" output indicates that the serial numbers do not match.

Error in column 630 indicates the location in the system where configuration information may have been lost. Configuration information may be lost in only the system firmware data or in both the system firmware data and the service processor data.

Rows 640 through 642 indicate the location of the configuration information loss based on the conditions presented in columns 610 and 620. For example, row 640 indicates that all configuration information is current and that no error exists in the system. Row 641 indicates that potential configuration information losses exist in both the system firmware data and the service processor data if the data processing system was not the last system to which the service processor was connected. Row 642 indicates that potential configuration information losses exist only in the system firmware data if the service processor was not the last service processor to communicate with the system firmware.

Figure 7B:
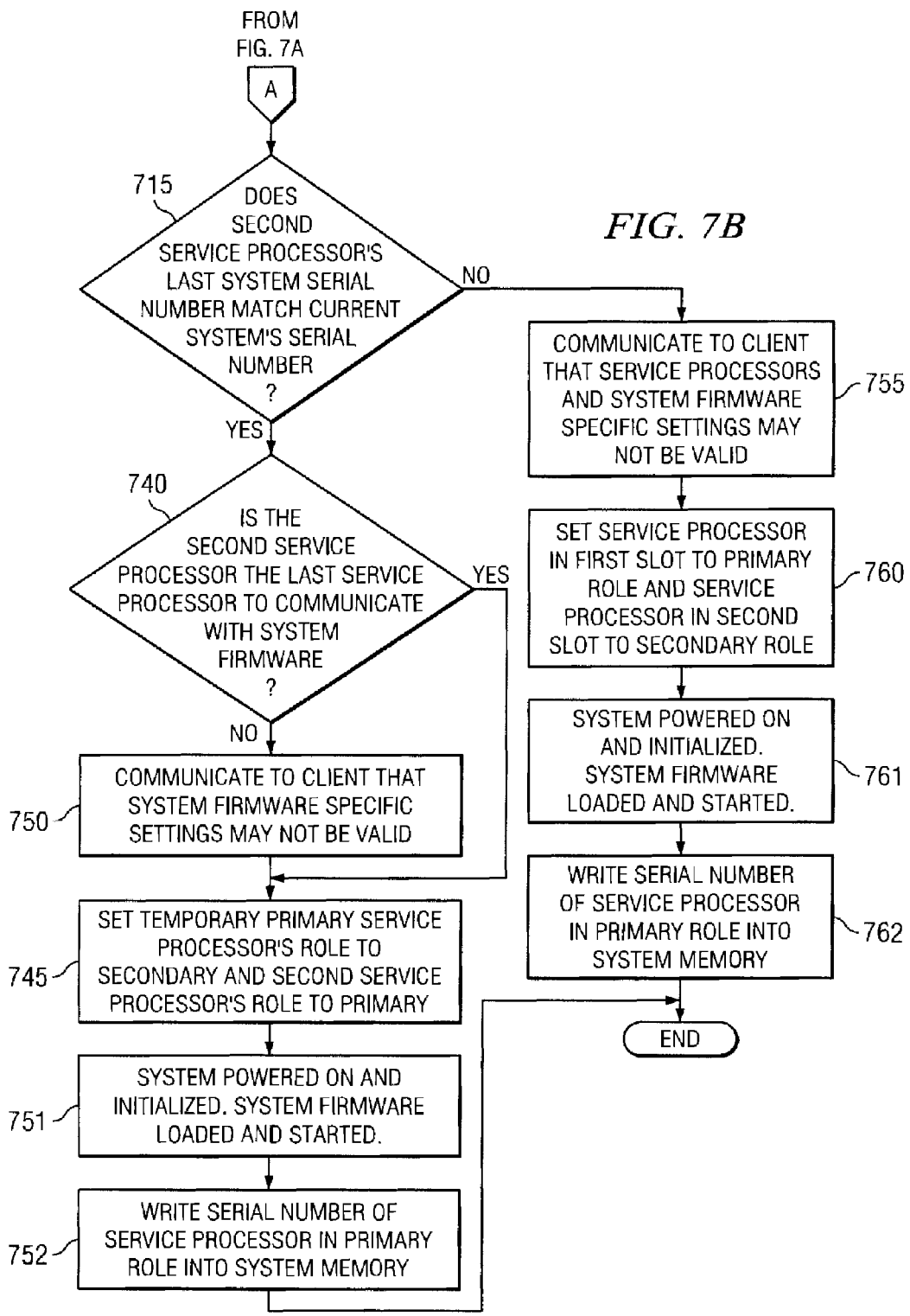
Figure 7C:
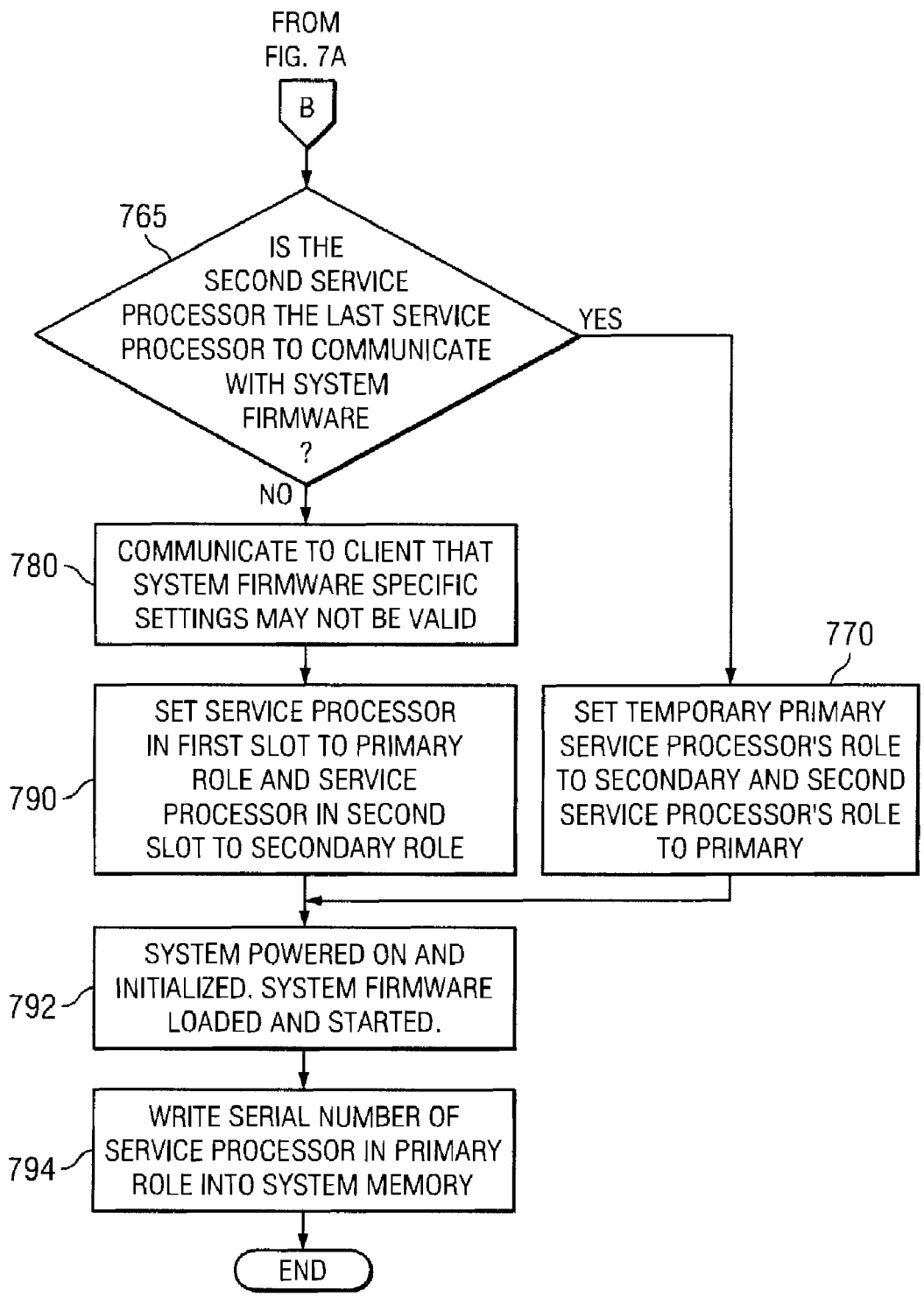

FIGS. 7A, 7B, and 7C are a flowchart of a process for identifying a service processor in a redundant service processor system, in accordance with an illustrative embodiment of the present invention. The process is executed in a service processor, such as service processor 231 of FIG. 2, in a data processing system, such as data processing system 200 of FIG. 2. In the aspects of the present invention, the service processor is in a plurality of service processors, and the process usually assigns the service processor in the first slot as the temporary primary service processor.

The process begins with the temporary primary service processor retrieving first stored information and second stored information (step 700). A determination is then made as to whether the temporary primary service processor's last system serial number matches the current system's serial number (step 710). If the current system is the last system to which the temporary primary service processor was connected ("yes" output to step 710), then a determination is made as to whether the temporary primary service processor is the last service processor to communicate with the system firmware (step 720). If the temporary primary service processor is the last service processor to fully communicate with the system firmware ("yes" output to step 720), then the process designates the temporary primary service processor to the primary role and the second service processor to the secondary role (step 735). The system is then powered on and initialized, and the process loads and starts the system firmware (step 736). The process then writes the serial number of the service processor in the primary role into the system memory (step 737). The process then ends.

Returning to step 710, if the current system is not the last system to which the temporary primary service processor connected ("no" output to step 710), then a determination is made as to whether a second service processor's last system serial number matches the current system's serial number (step 715). If the current system is the last system to which the second service processor was last connected ("yes" output to step 715), then a determination is made as to whether the second service processor was the last service processor to communicate fully with the system firmware (step 740). If the second service processor is the last service processor to communicate fully with the system firmware ("yes" output to step 740), then the process designates the second service processor to the primary role and the temporary primary service processor to the secondary role (step 745). If the second service processor is not the last service processor to communicate fully with the system firmware ("no" output to step 740), then the process communicates to the client that the system firmware specific settings may not be valid (step 750). The process then designates the second service processor to the primary role and the temporary service processor to the secondary role (step 745). The system is then powered on and initialized, and the process loads and starts the system firmware (step 751). The process then writes the serial number of the service processor in the primary role into system memory (step 752), with the process terminating thereafter.

Returning to step 715, if the current system is not the last system to which the second service processor fully communicated with ("no" output to step 715), then the process sends a communication to the client that the specific settings in both the service processors and the system firmware may not be valid (step 755). The process then designates the service processor in the first slot to the primary role and the service processor in the second slot to the secondary role (step 760). In these examples, the temporary service processor is in the first slot. Thus, the process will designate the temporary service processor as the primary service processor. The system is then powered on and initialized, and the process loads and starts the system firmware (step 761). The process then writes the serial number of the service processor in the primary role into the system memory (step 762), with the process terminating thereafter.

Returning to step 720, if the temporary service processor was not the last service processor to fully communicate with the system firmware ("no" output to step 720), then a determination is made as to whether a second service processor's last system serial number matches the current system's serial number (step 725). If the current system is the last system that the second service processor was connected to ("yes" output to step 725), then a determination is made as to whether the second service processor was the last service processor to communicate fully with the system firmware (step 765). If the second service processor is the last service processor to communicate fully with the system firmware ("yes" output to step 765), then the process designates the second service processor to the primary role and the temporary primary service processor to the secondary role (step 770). If the second service processor is not the last service processor to communicate fully with the system firmware ("no" output to step 765), then the process sends a communication to the client that the system firmware specific settings may not be valid (step 780). The process then designates the service processor in the first slot to the primary role and the service processor in the second slot to the secondary role (step 790). The system is then powered on and initialized, and the process loads and starts the system firmware (step 792). The process then writes the serial number of the service processor in the primary role into the system memory (step 794), with the process terminating thereafter.

Returning to step 725, if the current system is not the last system to which the second service processor was connected ("no" output to step 725), then the system communicates to the client that the system firmware specific settings may not be valid (step 730). The process then designates the temporary primary service processor to the primary role and the second service processor to the secondary role (step 735). The system is then powered on and initialized, and the process loads and starts the system firmware (step 736). The process then writes the serial number of the service processor in the primary role into the system memory (step 737), with the process terminating thereafter.

Figure 8:
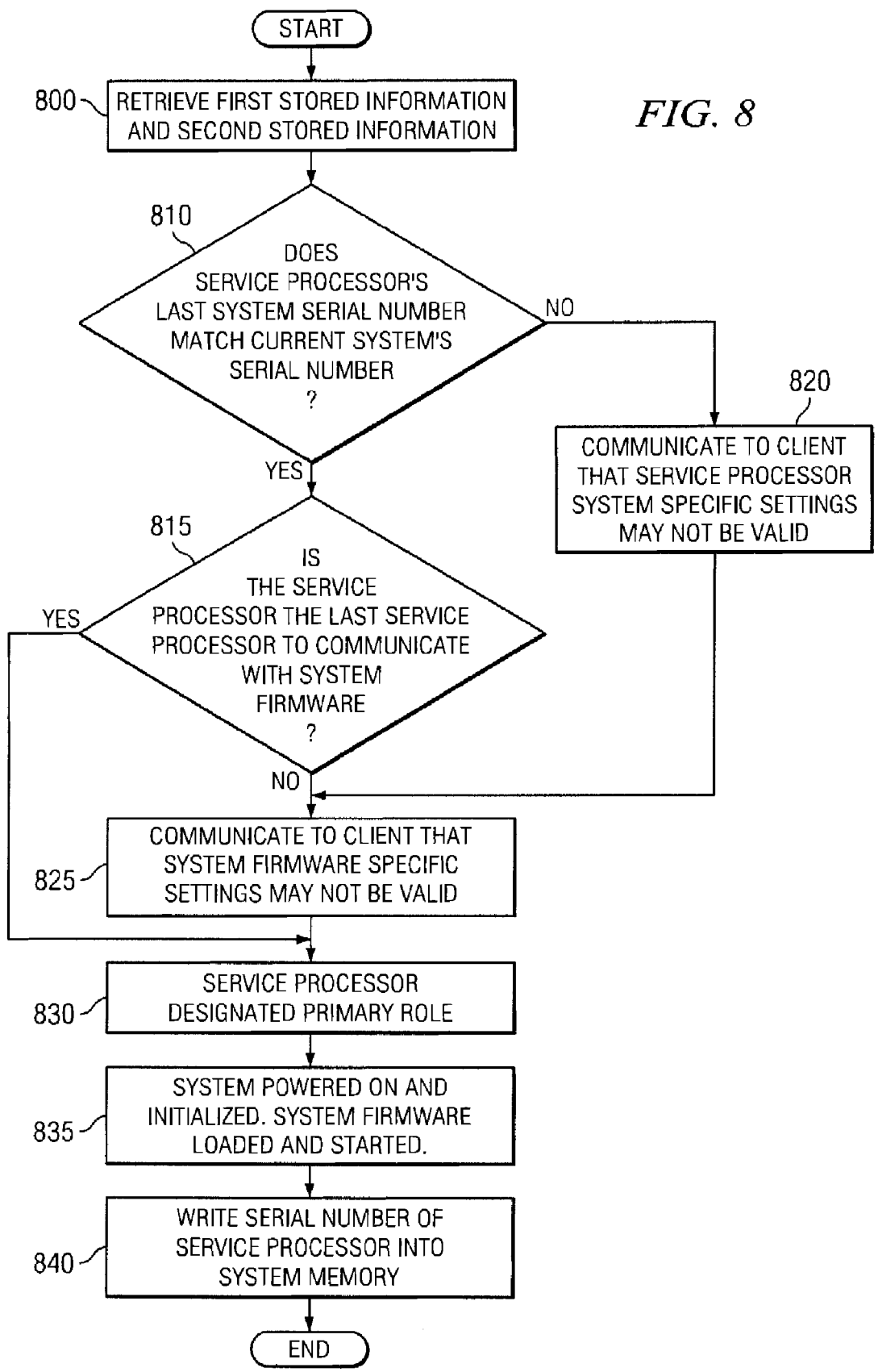
FIG. 8 is a flowchart of a process for identifying a service processor in a single service processor system, in accordance with an illustrative embodiment of the present invention.

FIG. 8 is a flowchart of a process for identifying a service processor in a single service processor system, in accordance with an illustrative embodiment of the present invention. The process is executed in a service processor, such as service processor 531 of FIG. 5.

The process begins with the service processor retrieving the first stored information and the second stored information (step 800). A determination is then made as to whether the service processor's last system serial number matches the current system's serial number (step 810). If the current system is the last system to which the service processor was connected ("yes" output to step 810), then a determination is made as to whether the service processor was the last service processor to communicate with the system firmware (step 815). If the service processor was the last service processor ("yes" to step 815), then the process designates the service processor to a primary role (step 830). The system is then powered on and initialized, and the process loads and starts the system firmware (step 835). The process then writes the serial number of the service processor into the system memory (step 840), with the process terminating thereafter.

Returning to step 810, if the current system is not the last system that the service processor was connected to, then the process communicates to the client that the service processor system (step 820) and the system firmware specific settings (step 825) may not be valid. The process then designates the service processor to a primary role (step 830). The system is then powered on and initialized, and the process loads and starts the system firmware (step 835). The process then writes the serial number of the service processor into the system memory (step 840), with the process terminating thereafter.

Returning to step 815, if the service processor was not the last service processor to communicate with the system firmware ("no" output to step 815), then the process communicates to the client that the system firmware specific settings may not be valid (step 825). The process then designates the service processor to a primary role (step 830). The system is then powered on and initialized, and the process loads and starts the system firmware (step 835). The process then writes the serial number of the service processor into the system memory (step 840), with the process terminating thereafter.

Figure 9:
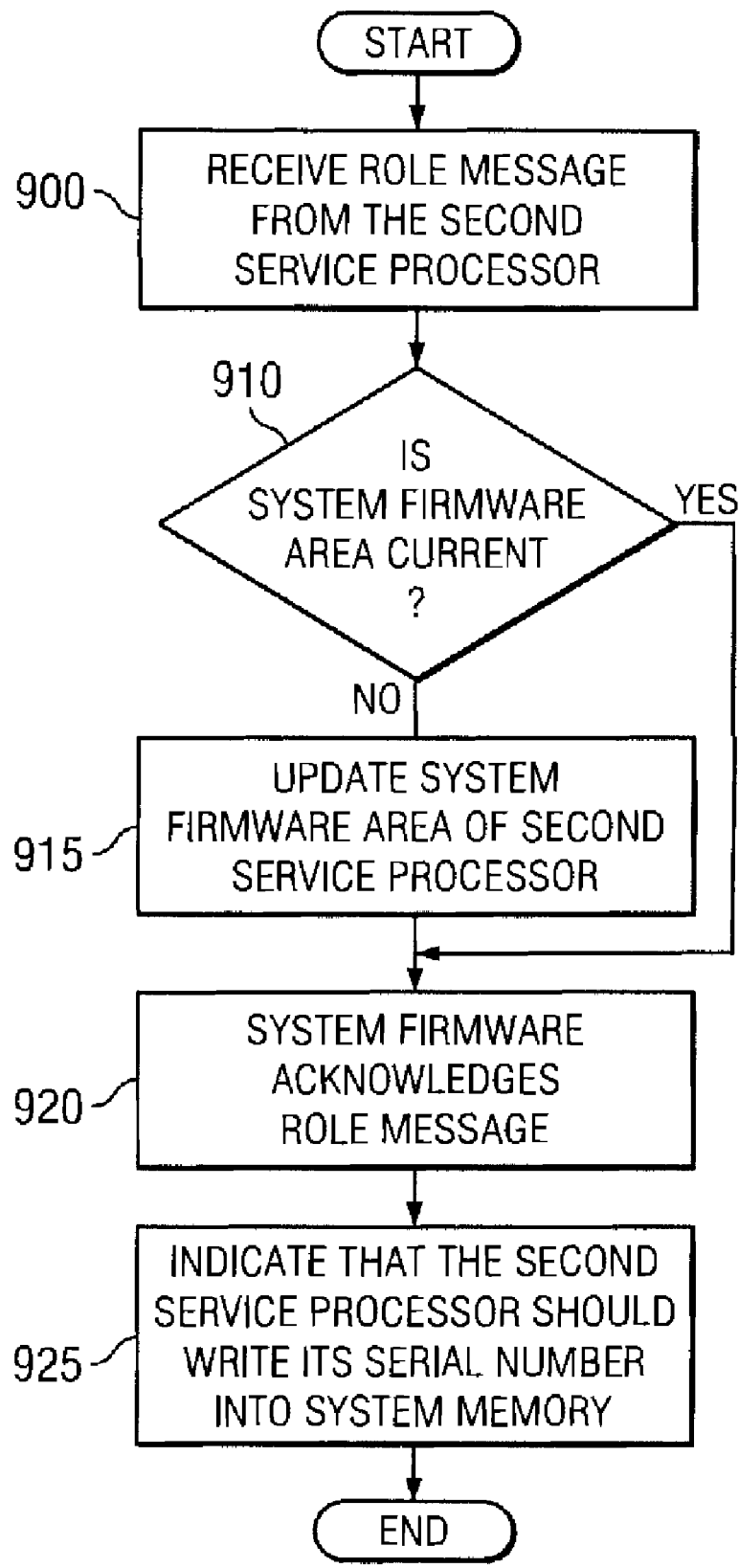
FIG. 9 is a flowchart of a process used when a primary service processor fails or is otherwise unavailable, in accordance with an illustrative embodiment of the present invention.

FIG. 9 is a flowchart of a process used when a primary service processor fails or is otherwise unavailable, in accordance with an illustrative embodiment of the present invention. The process is executed in a host processor, such as a host processor in host processor nest 212 of FIG. 2.

The process begins with the system firmware receiving a role message from the second service processor indicating that the second service processor is now taking over the primary role (step 900). A determination is then made as to whether the information in the system firmware area in the second service processor is current (step 910). If the system information is not current ("no" output to step 910), then the process updates the information in the system firmware area of the second service processor (step 915). The system firmware then acknowledges the role message (step 920) and indicates that the second service processor should write its service number into the system memory (step 925). The process then ends.

Returning to step 910, if the system firmware information is current ("yes" output to step 910), then the system firmware acknowledges the role message (step 920) and indicates that the second service processor should write its service number into the system memory (step 925). The process then ends.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for identifying a service processor with current setting information for a computer system, the computer implemented method comprising:

storing the computer system's system firmware in the service processor, which resides in a slot in the computer system; and responsive to the computer system receiving standby power and prior to the service processor loading system firmware into system memory, which is included in the computer system:

retrieving, by the service processor, first stored information for the service processor from a first memory in the service processor;

retrieving, by the service processor, second stored information for the service processor from a second memory in the computer system; and comparing, by the service processor, the first stored information with the second stored information to form a comparison as to whether the service processor was previously connected to the computer system and to determine whether the service processor was a last service processor to fully communicate with the system firmware, wherein the service processor has current setting information if the service processor was previously connected to the computer system and was the last service processor to fully communicate with the system firmware.

2. The computer implemented method of claim 1 further comprising:

responsive to the service processor being connected to the computer system, collecting data from the computer system to form collected information; and storing the collected information in the first stored information in the first memory in the service processor.

3. The computer implemented method of claim 1 further comprising:

loading the system firmware into the system memory;

executing the system firmware; and responsive to loading and executing the system firmware, writing an identification of the service processor into the second stored information in the second memory, wherein the identification indicates that the service processor was a last service processor to communicate with the system firmware.

4. The computer implemented method of claim 1 further comprising:

responsive to the service processor having the current settings, designating a primary role to the service processor.

5. The computer implemented method of claim 1 further comprising:

responsive to an absence of the comparison that the service processor was previously connected to the computer system, communicating a message to a client indicating that information in system firmware data and service processor data are invalid; and responsive to an absence of the determination that the service processor was the last service processor to fully communicate with the system firmware, communicating a message to a client that the information in the system firmware data is invalid.

6. The computer implemented method of claim 1, wherein the service processor is a first service processor in a plurality of service processors, the method further comprising:

assigning the first service processor as a temporary primary service processor;

responsive to the temporary primary service processor having the current settings, designating a primary role to the temporary primary service processor and a secondary role to a second service processor;

responsive to an absence of comparison as to whether the service processor was previously connected to the computer system or an absence of the determination that the temporary primary service processor is the last service processor, retrieving third stored information for the second service processor from a third memory in the second service processor;

responsive to retrieving the third stored information, comparing the second stored information with the third stored information to form a comparison as to whether the second stored processor was previously connected to the computer system and to determine whether the second service processor was the last service processor to fully communicate with the system firmware; and responsive to comparing the second stored information with the third stored information, designating the primary role to the second service processor and the secondary role to the temporary primary service processor.

7. The computer implemented method of claim 6, further comprising:

responsive to an absence of the comparison as to whether the service processor was previously connected to the computer system, communicating a message to a client indicating that information in system firmware data and data in the first and second service processors are invalid; and responsive to an absence of the determination that the second service processor was the last service processor to fully communicate with the system firmware, communicating a message to the client that the information in the system firmware data is invalid.

8. An apparatus for identifying a service processor with current setting information for a computer system, the apparatus comprising:

the service processor residing in a slot in the computer system, wherein the computer system's system firmware is stored in the service processor;

a first memory in the service processor for storing first stored information;

a second memory in the computer system for storing second stored memory; and wherein, responsive to the computer system receiving standby power and prior to the service processor loading system firmware into system memory, which is included in the computer system:

the first stored information is retrieved by the service processor from the first memory;

the second stored information is retrieved by the service processor from the second memory;

the service processor compares the first stored information with the second stored information to form a comparison as to whether the service processor was previously connected to the computer system and to determine whether the service processor was a last service processor to fully communicate with the system firmware, and wherein the service processor has current settings if the service processor was previously connected to the computer system and was the last service processor to fully communicate with the system firmware.

9. The apparatus of claim 8, wherein the service processor is designated a primary role in response to a determination that the service processor has the current settings.

10. The apparatus of claim 9, wherein the service processor communicates a message to a client indicating that information in system firmware data and service processor data is invalid in response to an absence of the comparison as to whether the service processor was previously connected to the computer system, and wherein the service processor communicates a message to a client that the information in the system firmware data is invalid in response to an absence of the determination that the service processor was the last service processor to fully communicate with the system firmware.

11. The apparatus of claim 8, wherein the service processor is a first service processor in a plurality of service processors, the system further comprising:

a second service processor in a plurality of service processors, wherein the second service processor is connected to the second memory;

a temporary primary service processor, wherein the first service processor is assigned as the temporary primary service processor;

a third memory in the second service processor for storing third stored information, wherein the temporary primary service processor retrieves the third stored information in response to an absence of the determination that the temporary primary service processor has the current settings, and wherein the temporary primary service processor compares the second stored information with the third stored information to form a comparison as to whether the second stored processor was previously connected to the computer system and to determine whether the second service processor was the last service processor to fully communicate with the system firmware in the computer system, and wherein the second service processor has the current settings if the second service processor was previously connected to the computer system and was the last service processor to fully communicate with the system firmware;

a primary service processor, wherein the temporary service processor is assigned as the primary service processor in response to the temporary service processor having the current settings, and wherein the second service processor is assigned as the primary service processor in response to the second service processor having the current settings; and a secondary service processor, wherein a second service processor is assigned as the secondary service processor in response to the temporary service processor being assigned as the primary service processor, and wherein the temporary primary service processor is assigned as the secondary service processor in response to the second service processor being assigned as the primary service processor.

12. The apparatus of claim 11, wherein the primary service processor communicates a message to a client indicating that information in system firmware data and data in the first and second service processors are invalid in response to an absence of the comparison as to whether the service processor was previously connected to the computer system, and wherein the primary service processor communicates a message to a client that the information in the system firmware data is invalid in response to an absence of the determination that the temporary primary service processor or the secondary service processor was the last service processors to fully communicate with the system firmware.

13. A computer usable program code in a computer readable medium for identifying a service processor with current setting information for a computer system, the computer usable program code comprising:

instructions for storing the computer system's system firmware in the service processor, which resides in a slot in the computer system; and responsive to the computer system receiving standby power and prior to the service processor loading system firmware into system memory, which is included in the computer system;

instructions for retrieving, by the service processor, first stored information for the service processor from a first memory in the service processor;

instructions for retrieving, by the service processor, second stored information for the service processor from a second memory in the computer system; and instructions for comparing, by the service processor, the first stored information with the second stored information to form a comparison as to whether the service processor was previously connected to the computer system and to determine whether the service processor was a last service processor to fully communicate with the system firmware, wherein the service processor has current setting information if the service processor was previously connected to the computer system and was the last service processor to fully communicate with the system firmware.

14. The computer usable program code of claim 13 further comprising:

responsive to the service processor being connected to the computer system, instructions for collecting data from the computer system to form collected information; and instructions for storing the collected information in the first stored information in the first memory in the service processor.

15. The computer usable program code of claim 13 further comprising:

instructions for loading the system firmware into the system memory;

instructions for executing the system firmware; and responsive to loading and executing the system firmware, instructions for writing an identification of the service processor into the second stored information in the second memory, wherein the identification indicates that the service processor was a last service processor to communicate with the system firmware.

16. The computer usable program code of claim 13 further comprising:

responsive to the service processor having the current settings, instructions for designating a primary role to the service processor.

17. The computer usable program code of claim 16 further comprising:

responsive to an absence of the comparison that the service processor was previously connected to the computer system, instructions for communicating a message to a client indicating that information in system firmware data and service processor data are invalid; and responsive to an absence of the determination that the service processor was the last service processor to fully communicate with the system firmware, instructions for communicating a message to a client that the information in the system firmware data is invalid.

18. The computer usable program code of claim 13, wherein the service processor is a first service processor in a plurality of service processors, the computer usable program code further comprising:

instructions for assigning the first service processor as a temporary primary service processor;

responsive to the temporary primary service processor having the current settings, instructions for designating a primary role to the temporary primary service processor and a secondary role to a second service processor;

responsive to an absence of comparison as to whether the service processor was previously connected to the computer system or an absence of the determination that the temporary primary service processor is the last service processor, instructions for retrieving third stored information for the second service processor from a third memory in the second service processor;

responsive to retrieving the third stored information, instructions for comparing the second stored information with the third stored information to form a comparison as to whether the second stored processor was previously connected to the computer system and to determine whether the second service processor was the last service processor to fully communicate with the system firmware; and responsive to comparing the second stored information with the third stored information, instructions for designating the primary role to the second service processor and the secondary role to the temporary primary service processor.

19. The computer usable program code of claim 18 further comprising:

responsive to an absence of the comparison as to whether the service processor was previously connected to the computer system, instructions for communicating a message to a client indicating that information in system firmware data and data in the first and second service processors is invalid; and responsive to an absence of the determination that the second service processor was the last service processor to fully communicate with the system firmware, instructions for communicating a message to the client that the information in the system firmware data is invalid.

* * * * *